(12) United States Patent
Yang

(10) Patent No.: US 9,030,478 B2
(45) Date of Patent: May 12, 2015

(54) THREE-DIMENSIONAL GRAPHICS CLIPPING METHOD, THREE-DIMENSIONAL GRAPHICS DISPLAYING METHOD, AND GRAPHICS PROCESSING APPARATUS USING THE SAME

(75) Inventor: Hua Yang, Beijing (CN)

(73) Assignee: VIA Technologies, Inc., New Taipei (TW)

( * ) Notice: Subject to any disclaimer, the term of this patent is extended or adjusted under 35 U.S.C. 154(b) by 428 days.

(21) Appl. No.: 13/473,619

(22) Filed: May 17, 2012

(65) Prior Publication Data

US 2012/0293512 A1    Nov. 22, 2012

(30) Foreign Application Priority Data

May 19, 2011  (CN) .......................... 2011 1 0130739

(51) Int. Cl.
*G06T 13/20* (2011.01)
*G06T 15/30* (2011.01)
(52) U.S. Cl.
CPC ....................................... *G06T 15/30* (2013.01)
(58) Field of Classification Search
None
See application file for complete search history.

(56) References Cited

U.S. PATENT DOCUMENTS

| 6,121,972 | A  | * | 9/2000 | Takahashi et al. | 345/419 |
| 6,687,393 | B1 | * | 2/2004 | Skinner, Jr. | 382/131 |
| 7,310,098 | B2 | * | 12/2007 | Ohba | 345/428 |
| 7,742,061 | B2 | * | 6/2010 | Chen | 345/620 |
| 2005/0116948 | A1 | * | 6/2005 | Joe et al. | 345/421 |
| 2009/0079762 | A1 | * | 3/2009 | Fukushima et al. | 345/621 |

* cited by examiner

*Primary Examiner* — Said Broome
(74) *Attorney, Agent, or Firm* — Jianq Chyun IP Office

(57) ABSTRACT

A three-dimensional (3D) graphics clipping method, a 3D graphics displaying method, and a 3D graphics processing apparatus using the same are provided. The 3D graphics clipping method includes following steps. A plurality of vertexes of a triangle is obtained, wherein a 3D object is constructed by using a plane of the triangle. Whether a view point is located between a first near clipping plane and a far clipping plane is determined. A second near clipping plane is set according to the determination result, and a view field is set between the second near clipping plane and the far clipping plane. A near clipping procedure is executed on the triangle according to the second near clipping plane. In the 3D graphics clipping method, a correct view field is determined in advance so that a graphics processing procedure is efficiently sped up and the accuracy of the near clipping procedure is increased.

20 Claims, 4 Drawing Sheets

THREE-DIMENSIONAL GRAPHICS CLIPPING METHOD, THREE-DIMENSIONAL GRAPHICS DISPLAYING METHOD, AND GRAPHICS PROCESSING APPARATUS USING THE SAME

CROSS-REFERENCE TO RELATED APPLICATION

This application claims the priority benefit of China application serial no. 201110130739.0, filed on May 19, 2011. The entirety of the above-mentioned patent application is hereby incorporated by reference herein and made a part of this specification.

BACKGROUND OF THE INVENTION

1. Field of the Invention

The invention generally relates to a three-dimensional (3D) graphics processing technique, and more particularly, to a 3D graphics clipping method when a view point is located between a near clipping plane and a far clipping plane, a 3D graphics displaying method, and a graphics processing apparatus using the same.

2. Description of Related Art

In an application of the three-dimensional (3D) graphics displaying technique (particularly, a computer game), the relative position of a stereoscopic object, a scene, and the view point of a viewer in the virtual 3D space quickly changes with the operation of the application (the computer game). Thus, high-speed graphics processing is desired in order to satisfy the viewer's requirement to high image quality of real-time graphics operation.

FIG. 1 is a diagram of a viewing pyramid in a 3D graphics displaying technique. Generally speaking, the 3D graphics displaying technique is to display a stereoscopic object and a scene that are observed by a viewer from a view point VP and are located within a view field VI between a near clipping plane 110 and a far clipping plane 120 onto a two-dimensional (2D) screen in unit of pixels through a rendering procedure. In other words, the graphics displayed on the 2D screen can be considered as a virtual image obtained by capturing the view field VI from the view point VP by using a virtual camera. Generally, the view field VI is defined by the near clipping plane 110 and the far clipping plane 120, and related information of the view point VP, the near clipping plane 110, and the far clipping plane 120 are carried in the image processing procedure.

In an existing 3D graphics displaying technique, a stereoscopic object is composed of many faces. Based on the geometrical characteristics of triangle (for example, the three vertexes of a triangle have to be located on the same plane), a stereoscopic object can be composed of many triangles. Herein the triangles 130 in FIG. 1 will be taken as examples. In order to achieve real-time operation and display stereoscopic objects, a designer usually deletes those triangles 130 that are not visible from the view point VP by polygonal culling and clipping procedures.

To be specific, the virtual camera also has a view field VI. When a triangle 130 intersects a boundary of the view field VI, the clipping procedure keeps the portion of the triangle 130 within the view field VI (a subsequent graphics processing procedure simply projects this portion of the triangle 130 onto the 2D screen) and deletes the portion of the triangle 130 outside the view field VI. Thereby, such a clipping procedure can speed up the rendering procedure of a current scene and reduce the hardware computing loading. Besides, such a clipping procedure allows an application developer to increase the operation precision of pre-rendering or real-time rendering operation and accordingly the frame rate and visual quality of displayed images.

However, in some cases (for example, in a fast-moving game scene), the view point may be located within the view field VI and a video card with a 3D hardware accelerator (or related hardware) that cannot resolve this problem still sets the view field VI according to the near clipping plane 110 and the far clipping plane 120. As a result, graphics processing errors may be produced. Regarding this problem, two resolutions are provided conventionally. According to the first resolution, the depth of field (DOF) between the view point and the near clipping plane is further determined by using a driver program or a software algorithm, and the parameters of related graphics processing procedures are re-set. According to the second resolution, a video card supporting a far clipping procedure is adopted to deal with the special situation in which the DOF of the screen space (i.e., the axis W of the screen space) is negative. However, the first resolution impacts the efficiency of real-time graphics processing, and the second resolution consumes a lot of hardware resources and reduces the precision of the clipping procedure.

Thereby, a 3D graphics clipping method for resolving problems produced when a view point is located between a near clipping plane and a far clipping plane is desired.

SUMMARY OF THE INVENTION

Accordingly, the invention is directed to a three-dimensional (3D) graphics clipping method, in which whether a view point is located between a near clipping plane and a far clipping plane is determined in advance and a near clipping procedure is executed by using a correct view field, so that a portion of a stereoscopic object between the near clipping plane and the view point is correctly deleted and the accuracy of the near clipping procedure is increased.

The invention is also directed to a 3D graphics displaying method, in which the relative positions of a view point, a near clipping plane, and a far clipping plane are determined in advance to set a correct view field, so that the portion of a stereoscopic object between the near clipping plane and the view point won't be displayed and the accuracy of a near clipping procedure is increased.

The invention is further directed to a 3D graphics processing apparatus, in which the relative positions of a view point, a near clipping plane, and a far clipping plane are determined in advance according to the hardware architecture to set a correct view field, so that the portion of a stereoscopic object between the near clipping plane and the view point won't be displayed and the accuracy of a near clipping procedure is increased.

The invention provides a 3D graphics clipping method which can clip a visible portion of at least one stereoscopic object in a 3D space. The 3D graphics clipping method includes following steps. Vertexes of at least one triangle are obtained, wherein the stereoscopic object in the 3D space is constructed by using a plane of the triangle. Whether a view point is located between a first near clipping plane and a far clipping plane is determined to generate a determination result. A second near clipping plane is set according to the determination result, and a view field is set between the second near clipping plane and the far clipping plane. A near clipping procedure is executed on the triangle according to the second near clipping plane.

The invention also provides a 3D graphics displaying method for displaying a 3D space on a screen. The 3D graphics displaying method includes following steps. A stereoscopic object is resolved into at least one triangle, wherein the triangle has a plurality of vertexes. A clipping procedure is executed to clip a visible portion of the stereoscopic object. A rendering procedure is executed to display the visible portion of the stereoscopic object on the screen. The clipping procedure includes following steps. Whether a view point is located between a first near clipping plane and a far clipping plane is determined to generate a determination result. A second near clipping plane is set according to the determination result, and a view field is set between the second near clipping plane and the far clipping plane. A near clipping procedure is executed on the triangle according to the second near clipping plane.

The invention further provides a 3D graphics processing apparatus for displaying a 3D space on a screen. The 3D graphics processing apparatus includes a vertex processing module, a clipping engine, and a pixel rendering module. The vertex processing module resolves a stereoscopic object in the 3D space into a plurality of triangles, wherein each of the triangles has a plurality of vertexes. The clipping engine coupled to the vertex processing module executes a clipping procedure to clip a visible portion of the 3D space. The clipping engine includes a view field module and a clipping module. The view field module determines whether a view point is located between a first near clipping plane and a far clipping plane to generate a determination result. When the view point is located between the near clipping plane and the far clipping plane, the clipping module coupled to the view field module sets a second near clipping plane according to the determination result, sets a view field between the second near clipping plane and the far clipping plane, and executes a near clipping procedure on the triangle according to the second near clipping plane. The pixel rendering module is coupled to the clipping engine and executes a rendering procedure to display the visible portion on the screen.

As described above, in an embodiment of the invention, whether a view point is located between a near clipping plane and a far clipping plane is determined in advance according to the hardware architecture, so as to correctly set a view field. A clipping module executes a near clipping procedure by using the adjusted near clipping plane (i.e., a second near clipping plane), so as to correctly clip a stereoscopic object between the near clipping plane and the view point. Thereby, graphics processing procedures (for example, geometrical conversion and clipping procedures) can be effectively sped up with the hardware architecture and the precision of the near clipping procedure can be increased.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
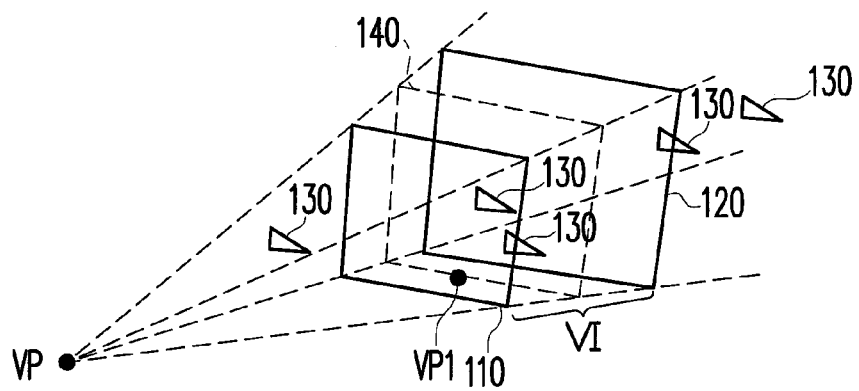
FIG. 1 is a diagram of a viewing pyramid in a three-dimensional (3D) graphics displaying technique.

Reference will now be made in detail to the present preferred embodiments of the invention, examples of which are illustrated in the accompanying drawings. Wherever possible, the same reference numbers are used in the drawings and the description to refer to the same or like parts.

Figure 2:
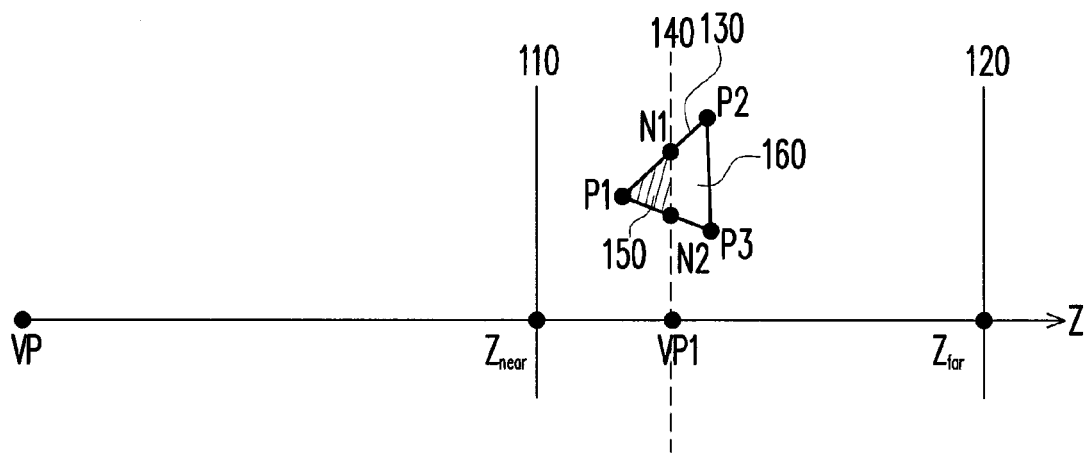
FIG. 2 is a diagram of a view field along the axis Z of a world space in FIG. 1.

FIG. 2 is a diagram of a view field VI along the axis Z of a world space in FIG. 1. Referring to both FIG. 1 and FIG. 2, generally speaking, the 3D graphics displaying technique is to convert stereoscopic objects (for example, the triangles 130 in FIG. 1 and FIG. 2) which are observed from the view point VP and located within the view field VI from the word space (X, Y, Z) to the screen space via a clipping space and display the converted stereoscopic objects on the screen. The view field VI is defined by the near clipping plane 110 (in the present embodiment, the near clipping plane 110 is also referred to as a first near clipping plane) and the far clipping plane 120, and the view point VP is not located within the view field VI.

Thereby, a video card with 3D hardware accelerator or related hardware defines a near depth of field (DOF) value $Z_{near}$ of the near clipping plane 110 and a far DOF value $Z_{far}$ of the far clipping plane 120 in advance (the near DOF value $Z_{near}$ is the coordinate value of the near clipping plane on axis Z of the world space, and the far DOF value $Z_{far}$ is the coordinate value of the far clipping plane on axis Z of the world space) to set the view field VI and determine parameters of related formulae in subsequent graphics processing procedures, so as to speed up the graphics processing process.

Additionally, clipping procedures can be roughly categorized into near clipping procedures and far clipping procedures based on the DOF. During a near clipping procedure, when a triangle 130 intersects the near clipping plane 110, the portion of the triangle 130 out of the boundary of the view field VI is deleted by the near clipping procedure, while the other portion of the triangle 130 within the boundary of the view field VI is kept. A far clipping procedure is similar to a near clipping procedure, and the difference is that during a far clipping procedure, the triangle 130 is clipped according to the far clipping plane 120. Besides, different algorithms are used in a far clipping procedure and a near clipping procedure. Because far clipping procedures require complicated hardware architectures, most video cards or related hardware do not support any far clipping procedure. Instead, they adopt other graphics processing algorithms (for example, the Z-testing algorithm) to perform the same function.

However, the existing clipping procedure comes with some flaws. In some special cases, a game designer may move the view point of a player or the position of a virtual camera from outside of the view field VI to a position between the near clipping plane 110 and the far clipping plane 120 (for example, from the view point VP to the view point VP1). In this case, the view field VI should be formed by the view point plane 140 corresponding to the view point VP1 and the far clipping plane 120, wherein the view point plane 140 is parallel to the far clipping plane 120. Thus, the clipping procedure should clip off the stereoscopic objects (for example, the polygonal portion 150 of the triangle 130 indicated by the shadow in FIG. 2) from the near clipping plane 110 to the view point VP1 and keep the polygonal portion 160 between the view point plane 140 and the far clipping plane 120.

The algorithm used in the clipping procedure of the present embodiment is supported by the hardware architecture, so that the graphics processing problems produced when the view point is located between a near clipping plane and a far clipping plane can be resolved. Accordingly, the graphics processing procedure can be sped up and the precision of the clipping procedure can be increased.

Figure 3:
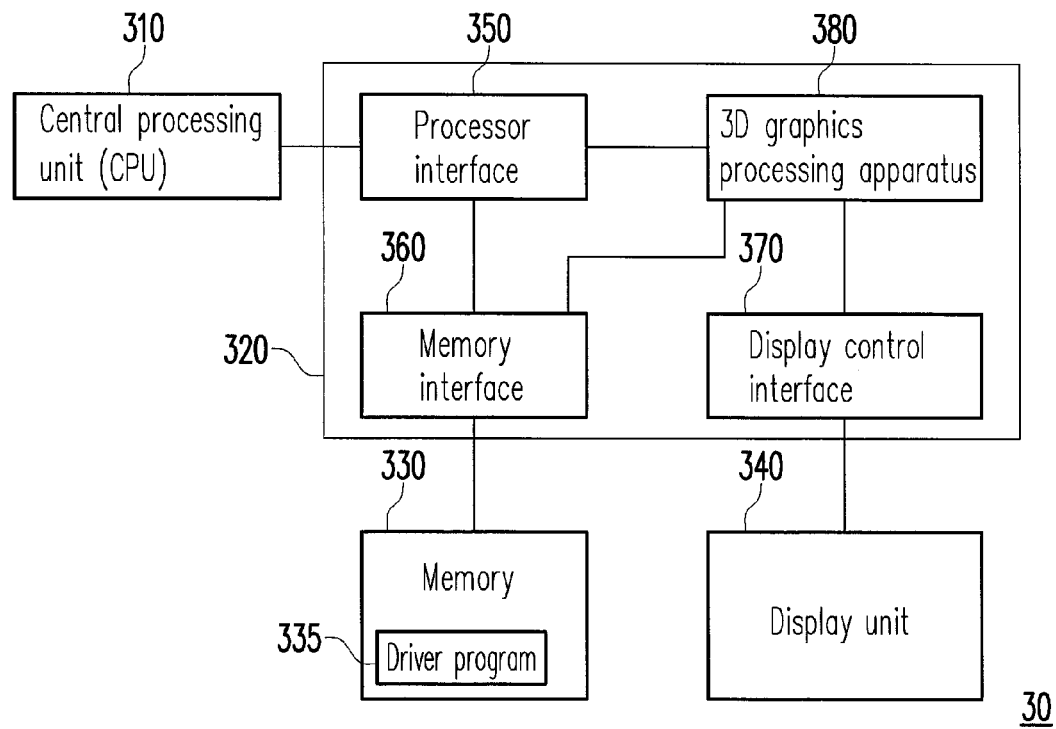
FIG. 3 is a block diagram of a computer system according to an embodiment of the invention.

A computer system 30 illustrated in FIG. 3 will be taken as an example to describe embodiments of the invention. FIG. 3 is a block diagram of the computer system 30 according to an embodiment of the invention. In the present embodiment, the computer system 30 may be a personal computer, a notebook computer, a video game console, or related hardware. The computer system 30 includes a central processing unit (CPU) 310, a display device 320, a memory 330, and a display unit 340.

The CPU 310 controls operation of the computer system 30 (for example, executes programs and processes information) and temporarily stores program codes, information, and data required during the operation into the memory 330. The CPU 310 also drives the display device 320 by using a driver program 335 in the memory 330. The display device 320 (for example, a video card) exclusively carries out image and graphics processing and display. The display device 320 is respectively coupled to the CPU 310, the memory 330, and the display unit 340 (for example, a liquid crystal display (LCD)) through a processor interface 350, a memory interface 360, and a display control interface 370. The display device 320 further includes a 3D graphics processing apparatus 380. The 3D graphics processing apparatus 380 exclusively carries out 3D graphics processing to realize the 3D graphics displaying method and the 3D graphics clipping method described in the present embodiment.

Figure 4:
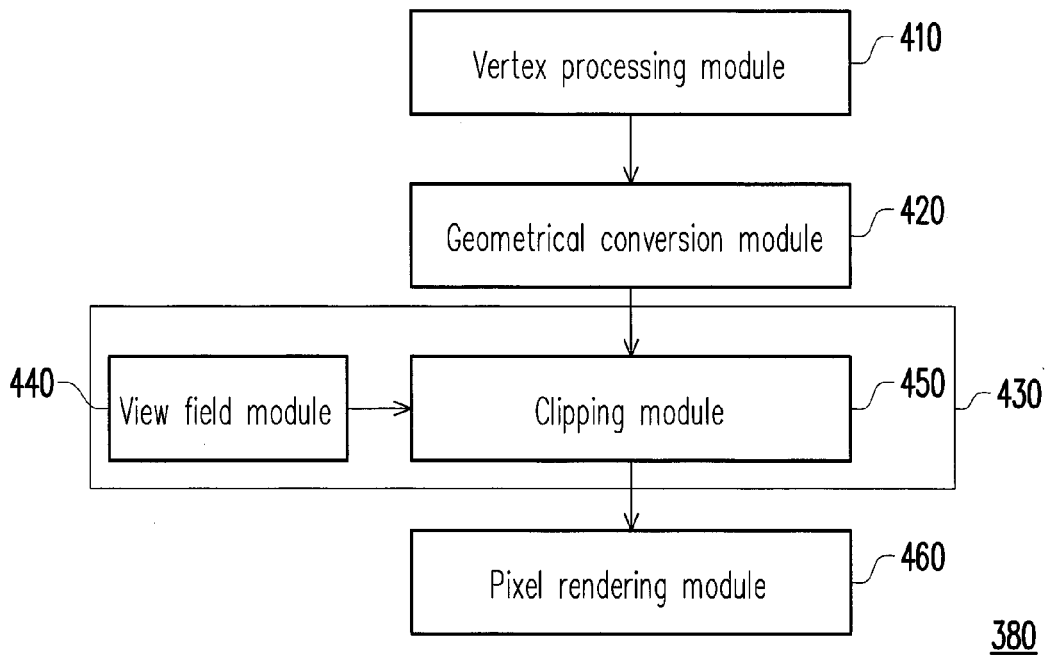
FIG. 4 is a block diagram of a 3D graphics processing apparatus according to an embodiment of the invention.
Figure 5:
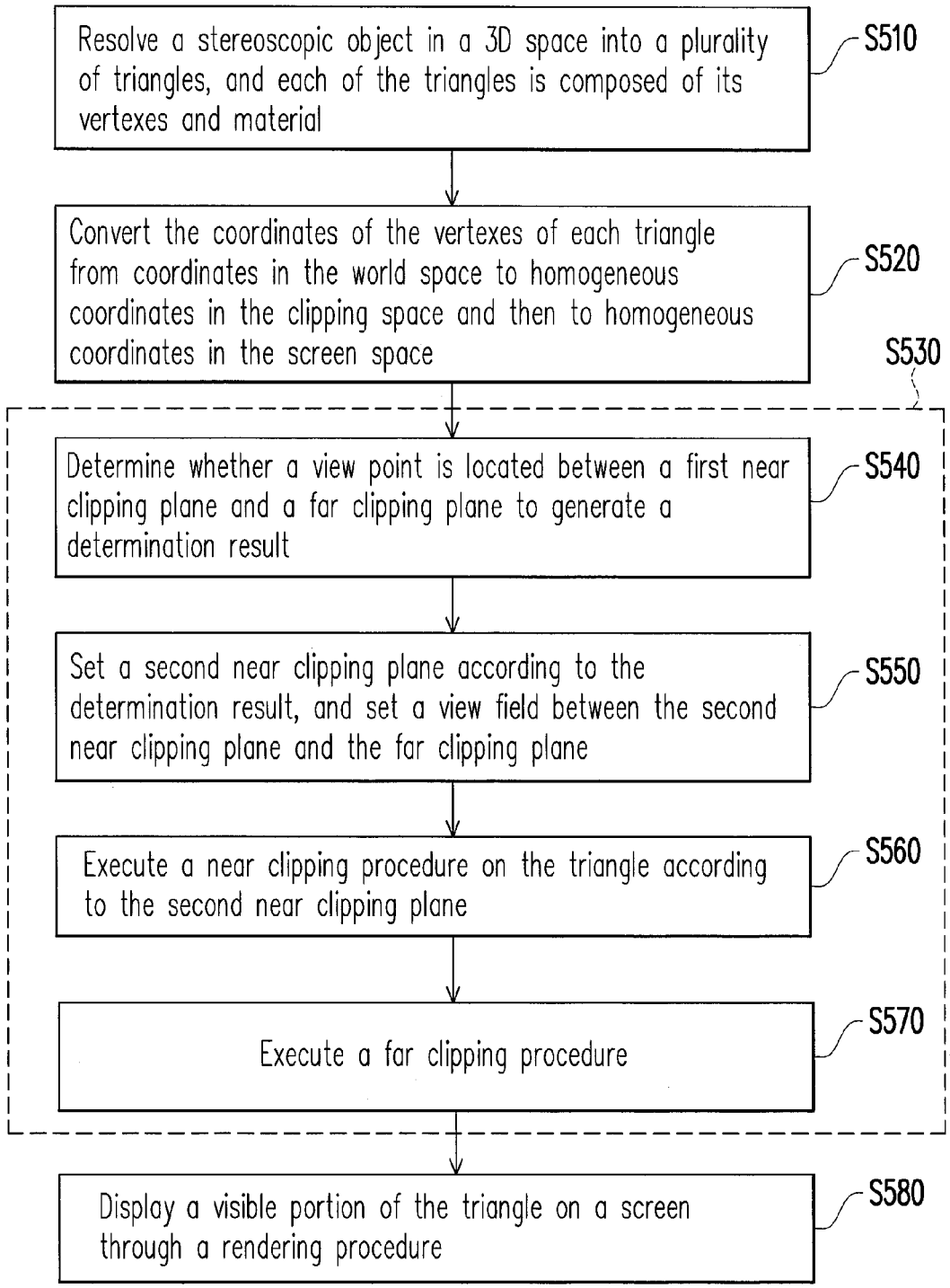
FIG. 5 is a flowchart of a 3D graphics displaying method according to an embodiment of the invention.

FIG. 4 is a block diagram of the 3D graphics processing apparatus 380 according to an embodiment of the invention. FIG. 5 is a flowchart of a 3D graphics displaying method according to an embodiment of the invention. The 3D graphics processing apparatus 380, which includes a vertex processing module 410, a geometrical conversion module 420 coupled to the vertex processing module 410, a clipping engine 430 coupled to the geometrical conversion module 420, and a pixel rendering module 460 coupled to the clipping engine 430, executes the 3D graphics displaying method illustrated in FIG. 5. The clipping engine 430, which includes a view field module 440 and a clipping module 450 coupled to the view field module 440, executes the 3D graphics clipping method in step S530 illustrated in FIG. 5.

Herein the 3D graphics displaying method will be explained with reference to the 3D graphics processing apparatus 380 in FIG. 4. First, in step S510, the vertex processing module 410 resolves a stereoscopic object in a 3D space into a plurality of primitives. These primitives may be composed of dots, line segments, triangles, or polygons and defined by vertexes of those primitives.

Based on the geometrical characteristic of the triangle mentioned above (i.e., the three vertexes of a triangle are located on the same plane), in the present embodiment, a triangle is taken as an example of aforementioned primitives. The triangle (for example, the triangle 130 in FIG. 2) is defined by the vertexes thereof (for example, the three vertexes P1, P2, and P3 in FIG. 2). The coordinates of each vertex are expressed with the homogeneous coordinates (X, Y, Z, W) thereof in the world space, wherein the axis X and the axis Y represents the 2D coordinates of the world space, the axis Z represents the DOF in the world space, and the axis W represents the DOF in the screen space. In addition, the axis W also represents a transitional parameter used in matrix operations (for example, scaling and shifting) executed with homogeneous coordinates in the conventional 3D graphics processing technique. However, the definition of the axis W will not be described herein.

Then, referring to FIG. 4 and FIG. 5 again, in step S520, the geometrical conversion module 420 converts the coordinates of the vertexes of the triangle from coordinates in the world space to homogeneous coordinates in the clipping space and then to homogeneous coordinates in the screen space. In the present embodiment, the geometrical conversion module 420 converts the vertex coordinates of the triangle from the homogeneous coordinates (X, Y, Z, W) in the world space to the homogeneous coordinates (X, Y, $Z_C$, $W_C$) in the clipping space by using following equation (1) and equation (2):

$$Z_C = \frac{Z - Z_{near}}{Z_{far} - Z_{near}} Z_{far} \tag{1}$$

$$W_C = Z \tag{2}$$

In foregoing equation (1) and equation (2), $Z_{near}$ is a near DOF value of the near clipping plane, and $Z_{far}$ is a far DOF value of the far clipping plane. According to foregoing equation (1) and equation (2), when the coordinate value $Z_C$ of every vertex of the triangle on the axis Z of the clipping space is smaller than zero ($Z_C$<0), the triangle exceeds the near clipping plane and is located outside the view field. On the other hand, when the coordinate value $Z_C$ of each vertex of the triangle on the axis Z of the clipping space is greater than the far DOF value $Z_{far}$ ($Z_C$>$Z_{far}$), the triangle exceeds the far clipping plane and is located outside the view field.

The geometrical conversion module 420 converts the vertex coordinates of the triangle into the homogeneous coordinates ($X_S$, $Y_S$, $Z_S$, $W_S$) in the screen space by using following equation (3) and equation (4), wherein $M_C$ is short for the 3-axis coordinates (X, Y, $Z_C$), and $M_S$ is short for the 3-axis coordinates ($X_S$, $Y_S$, $Z_S$):

$$M_S = \frac{M_C \times ScaleM}{M_C} + OffsetM \tag{3}$$

$$W_S = \frac{1}{W_C} \tag{4}$$

In foregoing equation (3) and equation (4), the parameter ScaleM represents the scaling factor for converting the clipping space into the screen space, and the parameter OffsetM represents the offset for converting the clipping space into the screen space. According to the present embodiment, all the homogeneous coordinates of the world space, the clipping space, and the screen space use the view point as the datum point (i.e., the origin).

However, in other embodiments, when the vertex processing module 410 resolves the triangle 130, it may directly express the vertex coordinates of the triangle 130 with the homogeneous coordinates of the screen space. Thus, in these embodiments, the 3D graphics processing apparatus 380 may not need the geometrical conversion module 420 to execute step S520. In other words, step S520 may not be essential for the 3D graphics displaying method in FIG. 5, and those implementing the present embodiment can adjust the 3D graphics displaying method in FIG. 5 according to their design requirements.

In step S530, the clipping engine 430 executes the clipping procedure in the present embodiment to clip a visible portion of the stereoscopic object in the 3D space. The clipping procedure in step S530 is the 3D graphics clipping method provided by the invention, and which will be explained below in detail.

The 3D graphics clipping method includes steps S540-S570 in FIG. 5. First, in step S540, the view field module 440 determines whether the view point of a viewer (or the position of a virtual camera) is located between a first near clipping plane (for example, the near clipping plane 110 in FIG. 2) and a far clipping plane (the far clipping plane 120 in FIG. 2) to generate a determination result. In step S550, the clipping module 450 sets a second near clipping plane according to the determination result of the view field module 440 and sets the area between the second near clipping plane and the far clipping plane as a view field.

Herein the step S540 will be explained in detail by taking FIG. 2 as an example. If the determination result in step S540 indicates that the view point VP1 is located between the first near clipping plane 110 and the far clipping plane 120, the clipping module 450 sets the view point plane 140 of the view point VP1 as the second near clipping plane. On the other hand, if the determination result in step S540 indicates that the view point is located outside the first near clipping plane 110 and the far clipping plane 120 (i.e., the view point is not located between the first near clipping plane 110 and the far clipping plane 120), the clipping module 450 sets the first near clipping plane 110 as the second near clipping plane. The view field set between the second near clipping plane and the far clipping plane in this way satisfies the actual 3D graphics displaying requirement.

In step S560, the clipping module 450 executes a near clipping procedure on the triangle 130 according to the second near clipping plane and the view field between the second near clipping plane and the far clipping plane 120, so as to obtain the polygonal portion 160 within the view field. The polygonal portion 160 can be constructed as a portion visible from the view point VP1 in the 3D space.

Next, in step S570, after the clipping module 450 finishes executing the near clipping procedure, it continues to execute a far clipping procedure (i.e., to execute the far clipping procedure on the triangle by using the far clipping plane (for example, the far clipping plane 120 in FIG. 2)), so as to complete the 3D graphics clipping method in the present embodiment. In other embodiments, the far clipping procedure may also be replaced by any other graphics processing method (for example, the Z-testing algorithm). Namely, this step can be implemented without executing the far clipping procedure.

Thereafter, the 3D graphics displaying method enters step S580 after step S530, in which the pixel rendering module 460 executes a rendering procedure to display the visible portion of the stereoscopic object in the display unit 340 (for example, a screen) in FIG. 3.

Figure 6:
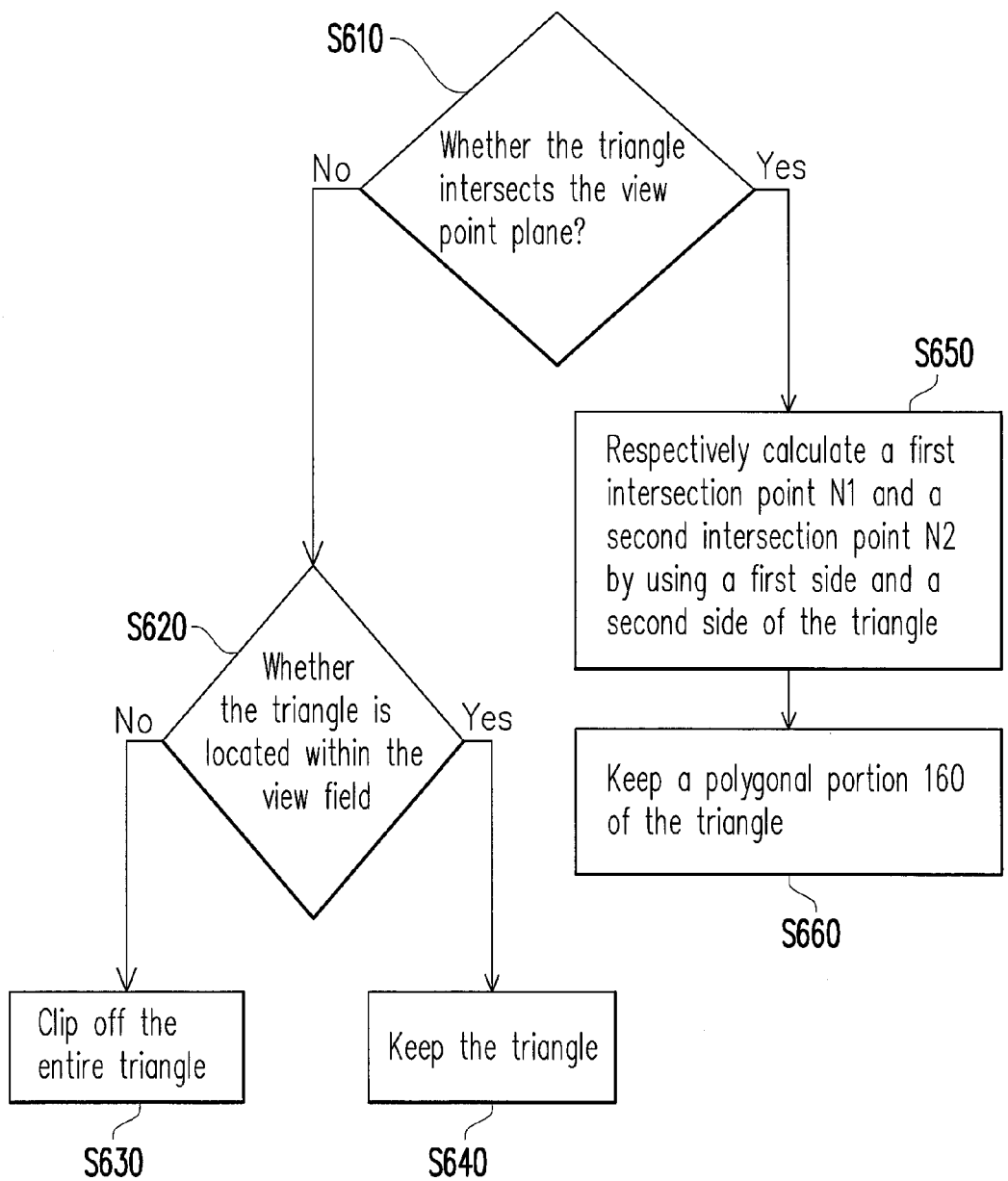
FIG. 6 is a flowchart of a near clipping procedure executed according to a view point plane and a triangle according to an embodiment of the invention.

Herein the algorithm adopted in the near clipping procedure will be explained with reference to step S560 and FIG. 6. FIG. 6 is a flowchart of a near clipping procedure executed by the clipping module 450 according to the second near clipping plane and the triangle 130 in an embodiment of the invention. Referring to FIG. 2 and FIG. 6, as described above, the second near clipping plane is either the first near clipping plane 110 (when the view point is located outside the first near clipping plane 110 and the far clipping plane 120) or the view point plane 140 (when the view point is located between the first near clipping plane 110 and the far clipping plane 120) according to the position of the view point. For the convenience of description, below, the second near clipping plane is assumed to be the view point plane 140.

In step S610, whether the triangle 130 intersects the view point plane 140 is determined. If the triangle 130 does not intersect the view point plane 140 and the triangle 130 is located outside the view field, the entire triangle 130 is clipped off through steps S620-S630. If the triangle 130 does not intersect the view point plane 140 and the triangle 130 is located within the view field, the entire triangle 130 is kept through steps S620-S640, so as to form a visible portion of the stereoscopic object.

When the triangle 130 intersects the view point plane 140, step S650 is executed after step S610, in which an intersection point N1 between a first side (defined by the vertexes P1 and P2) of the triangle 130 and the view point plane 140 and an intersection point N2 between a second side (defined by the vertexes P1 and P3) of the triangle 130 and the view point plane 140 are respectively calculated by using the first side and the second side.

To be specific, the clipping module 450 calculates the 3-axis coordinates $M_{N1}$ of the intersection point N1 by using an external vertex P1 outside the view field and an internal vertex P2 within the view field according to following equation (5):

$$M_{N1} = M_{C2} + (M_{C1} - M_{C2}) \times r \tag{5}$$

In foregoing equation (5), $M_{C1}$ and $M_{C2}$ respectively represent the 3-axis coordinates of the vertexes P1 and P2 in the clipping space, and the first ratio r is the ratio of the length from the intersection point N1 to the internal vertex P2 to the length of the first side.

Because the axis Z coordinate value of the view point plane 140 is zero, the ratio r can be calculated by using following equation (6) or (7):

$$r = \frac{Z_{P2}}{Z_{P2} - Z_{P1}} \tag{6}$$

$$= \frac{W_{C2}}{W_{C2} - W_{C1}} \tag{7}$$

$Z_{P1}$ and $Z_{P2}$ are respectively the axis Z coordinate values of the external vertex P1 and the internal vertex P2 in the world space, and $W_{C1}$ and $W_{C2}$ are respectively the axis W coordinate values of the external vertex P1 and the internal vertex P2 in the clipping space. The equation (7) is derived from the equation (6) by using the equation (4) in order to allow the hardware (for example, the clipping module 450) to quickly calculate the ratio r according to the coordinate values in the clipping space without referring to the coordinates in the world space again. In addition, the calculations of the intersection point N2 and the intersection point N1 are the same except that the coordinates of the intersection point N2 is calculated by using a second ratio of the length from the intersection point N2 to an internal vertex P3 to the length of the second side. The calculation of the intersection point N2 will not be described anymore herein.

After the first intersection point N1 and the second intersection point N2 are calculated, step S660 is executed, in which the clipping module 450 keeps the polygonal portion 160 of the triangle 130 within the view field and discards the polygonal portion 150 outside the view field, wherein the polygonal portion 160 is defined by the intersection points N1 and N2 and the internal vertexes P2 and P3, and the polygonal portion 150 is defined by the external vertex P1 and the intersection points N1 and N2. Thus, the clipping module 450 can clip the triangle 130 during a near clipping procedure by using the view point plane 140.

If the second near clipping plane is set as the first near clipping plane 110, the process is similar to that when the second near clipping plane is set as the view point plane 140 except that the near clipping procedure herein is executed according to the first near clipping plane 110 and the triangle 130. Thus, during the near clipping procedure, the intersection points of the near clipping plane and the triangle are calculated by using the equation (5) and following equation (8) or (9):

$$r = \frac{Z_{Pi} - Z_{near}}{Z_{Pi} - Z_{Po}} \quad (8)$$

$$= \frac{Z_{Pi} - \frac{Z_{Pi} - Z_{near}}{Z_{far} - Z_{near}} Z_{far}}{\frac{Z_{Pi} - Z_{near}}{Z_{far} - Z_{near}} Z_{far} - \frac{Z_{Po} - Z_{near}}{Z_{far} - Z_{near}} Z_{far}} = \frac{Z_{Ci}}{Z_{Ci} - Z_{Co}} \quad (9)$$

In foregoing equations (8) and (9), $Z_{Po}$ and $Z_{Pi}$ are respectively the axis Z coordinate values of an external vertex Po and an internal vertex Pi of the triangle in the world space, and $Z_{Co}$ and $Z_{Ci}$ are respectively the axis Z coordinate values of the external vertex Po and the internal vertex Pi in the clipping space. Herein the internal vertex Pi is a vertex of the triangle located within the view field, the external vertex Po is a vertex of the triangle located outside the view field, and the line segment defined by the internal vertex Pi and the external vertex Po is the side of the triangle that intersects the near clipping plane. The equation (9) is derived from the equation (8) by using the equation (1) in order to allow the hardware (for example, the clipping module 450) to quickly calculate the ratio r according to the coordinate values in the clipping space without referring to the coordinates in the world space again.

Additionally, the far clipping procedure in step S570 of FIG. 5 is similar to the near clipping procedure described above except that during the far clipping procedure, the operation is carried out by using the far clipping plane and the triangle and the polygonal portion within the view field is kept. Thereby, during the far clipping procedure, the intersection points of the far clipping plane and the triangle are calculated by using foregoing equation (5) and following equation (10) or (11):

$$r = \frac{Z_{Pi} - Z_{far}}{Z_{Pi} - Z_{Po}} \quad (10)$$

$$= \frac{Z_{Pi} - \frac{Z_{Pi} - Z_{near}}{Z_{far} - Z_{near}} Z_{far}}{\left(Z_{Pi} - \frac{Z_{Pi} - Z_{near}}{Z_{far} - Z_{near}} Z_{far}\right) - \left(Z_{Po} - \frac{Z_{Po} - Z_{near}}{Z_{far} - Z_{near}} Z_{far}\right)}$$

$$= \frac{W_{Ci} - Z_{Ci}}{(W_{Ci} - Z_{Ci}) - (W_{Co} - Z_{Co})} \quad (11)$$

In foregoing equations (10) and (11), $W_{Co}$ and $W_{Ci}$ are respectively the axis W coordinate values of the external vertex Po and the internal vertex Pi in the clipping space. The line segment defined by the internal vertex Pi and the external vertex Po is the side of the triangle that intersects the far clipping plane. The equation (11) is also derived from the equation (10) by using the equation (1) for the operation convenience of the hardware.

In the conventional resolution in which the view field is determined again by using a driver program, the driver program determines whether a vertex exceeds a far clipping plane according to whether the axis Z coordinate value $Z_C$ of the vertex in the clipping space is greater than the axis W coordinate value $W_C$ of the vertex in the clipping space (please refer to the equations (1) and (2)) to replace the original guideline of whether the axis Z coordinate value $Z_C$ is greater than the far DOF value $Z_{far}$ of the far clipping plane. However, such a determination guideline only works when the axis W coordinate value $W_C$ is greater than zero. Thus, in some special cases (i.e., the view point is located between the near clipping plane and the far clipping plane), the axis W coordinate value $W_C$ of the vertex is likely to be negative, and accordingly a determination error is produced. Contrarily, the 3D graphics clipping method provided by the invention is based on coordinate conversion from the clipping space to the screen space, in which whether the axis Z coordinate value $Z_C$ is greater than the far DOF value $Z_{far}$ of the far clipping plane is determined in the clipping procedure. Accordingly, the problem mentioned above is avoided.

As described above, in an embodiment of the invention, whether a view point is located between a near clipping plane and a far clipping plane is determined in advance according to the hardware architecture, so as to correctly set a view field. The clipping module 450 executes a near clipping procedure by using the adjusted near clipping plane, so as to correctly clip a stereoscopic object between the near clipping plane and the view point. Thereby, graphics processing procedures can be effectively sped up with the hardware architecture and the precision of the near clipping procedure can be increased.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A three-dimensional (3D) graphics clipping method, for clipping a visible portion of at least one stereoscopic object in a 3D space, the 3D graphics clipping method comprising:
   obtaining a plurality of vertexes of a triangle by a 3D graphics processing apparatus, wherein the stereoscopic object is constructed by using a plane of the triangle;
   determining whether a view point is located between a first near clipping plane and a far clipping plane to generate a determination result by the 3D graphics processing apparatus;
   setting a second near clipping plane according to the determination result and setting a view field between the second near clipping plane and the far clipping plane by the 3D graphics processing apparatus; and
   executing a near clipping procedure on the triangle according to the second near clipping plane by the 3D graphics processing apparatus,
   wherein the step of setting the second near clipping plane according to the determination result and setting the view field between the second near clipping plane and the far clipping plane by the 3D graphics processing apparatus comprises:
   when the determination result indicates that the view point is located between the first near clipping plane and the far clipping plane, setting a view point plane of the view point as the second near clipping plane, wherein the view point plane is parallel to the far clipping plane.

2. The 3D graphics clipping method according to claim 1, wherein the step of setting the second near clipping plane according to the determination result and setting the view field between the second near clipping plane and the far clipping plane by the 3D graphics processing apparatus comprises:

when the determination result indicates that the view point is not located between the first near clipping plane and the far clipping plane, setting the first near clipping plane as the second near clipping plane.

3. The 3D graphics clipping method according to claim 1, wherein the step of executing the near clipping procedure on the triangle according to the second near clipping plane by the 3D graphics processing apparatus comprises:

when the triangle intersects the second near clipping plane, respectively calculating a first intersection point and a second intersection point of the triangle and the second near clipping plane by using a first side and a second side of the triangle, wherein the triangle intersects with the second near clipping plane at the first side and the second side; and keeping a polygonal portion of the triangle within the view field, wherein the polygonal portion is formed by the first intersection point, the second intersection point, and at least one internal vertex, the internal vertex is one of the vertexes located within the view field, and the polygonal portion forms the visible portion.

4. The 3D graphics clipping method according to claim 3, wherein the step of calculating the first intersection point or the second intersection point comprises:

calculating a first ratio, wherein the first ratio is a ratio of a length from the first intersection point to the internal vertex to a length of the first side or a radio of a length from the second intersection point to the internal vertex to a length of the second side; and calculating 3-axis coordinates of the first intersection point or the second intersection point according to 3-axis coordinates of the internal vertex, 3-axis coordinates of an external vertex, and the first ratio, wherein the internal vertex and the external vertex are respectively two endpoints of the first side or the second side.

5. The 3D graphics clipping method according to claim 4, wherein the first ratio is calculated by using an axis W coordinate value in a clipping space, or by using an axis Z coordinate value in a world space, or by using an axis Z coordinate value in the clipping space.

6. The 3D graphics clipping method according to claim 1, wherein the step of executing the near clipping procedure on the triangle according to the second near clipping plane by the 3D graphics processing apparatus comprises:

when the triangle does not intersect the second near clipping plane and the triangle is located outside the view field, the triangle is clipped off; and when the triangle does not intersect the second near clipping plane and the triangle is located within the view field, the triangle is kept.

7. The 3D graphics clipping method according to claim 6, wherein when an axis Z coordinate value in a clipping space of every vertex of the triangle is smaller than zero, the triangle does not intersect the second near clipping plane and is located outside the view field.

8. A 3D graphics displaying method, for displaying a 3D space on a screen, the 3D graphics displaying method comprising:

resolving at least one stereoscopic object in the 3D space into at least one triangle by a 3D graphics processing apparatus, wherein the triangle has a plurality of vertexes;

executing a clipping procedure to clip a visible portion by the 3D graphics processing apparatus; and executing a rendering procedure to display the visible portion on the screen by the 3D graphics processing apparatus, wherein the clipping procedure comprises:

determining whether a view point is located between a first near clipping plane and a far clipping plane to generate a determination result by the 3D graphics processing apparatus;

setting a second near clipping plane according to the determination result and setting a view field between the second near clipping plane and the far clipping plane by the 3D graphics processing apparatus; and executing the near clipping procedure on the triangle according to the second near clipping plane by the 3D graphics processing apparatus, wherein the step of setting the second near clipping plane according to the determination result and setting the view field between the second near clipping plane and the far clipping plane by the 3D graphics processing apparatus comprises:

when the determination result indicates that the view point is located between the first near clipping plane and the far clipping plane, setting a view point plane of the view point as the second near clipping plane, wherein the view point plane is parallel to the far clipping plane.

9. The 3D graphics displaying method according to claim 8, wherein the step of setting the second near clipping plane according to the determination result and setting the view field between the second near clipping plane and the far clipping plane by the 3D graphics processing apparatus comprises:

when the determination result indicates that the view point is not located between the first near clipping plane and the far clipping plane, setting the first near clipping plane as the second near clipping plane.

10. The 3D graphics displaying method according to claim 8, wherein the step of executing the near clipping procedure on the triangle according to the second near clipping plane by the 3D graphics processing apparatus comprises:

when the triangle intersects the second near clipping plane, respectively calculating a first intersection point and a second intersection point of the triangle and the second near clipping plane by using a first side and a second side of the triangle, wherein the triangle intersects with the second near clipping plane at the first side and the second side; and keeping a polygonal portion of the triangle within the view field, wherein the polygonal portion is formed by the first intersection point, the second intersection point, and at least one internal vertex, the internal vertex is one of the vertexes located within the view field, and the polygonal portion forms the visible portion.

11. The 3D graphics displaying method according to claim 10, wherein the step of calculating the first intersection point or the second intersection point comprises:

calculating a first ratio, wherein the first ratio is a ratio of a length from the first intersection point to the internal vertex to a length of the first side or a radio of a length from the second intersection point to the internal vertex to a length of the second side; and calculating 3-axis coordinates of the first intersection point or the second intersection point according to 3-axis coordinates of the internal vertex, 3-axis coordinates of an external vertex, and the first ratio, wherein the internal vertex and the external vertex are respectively two endpoints of the first side or the second side.

12. The 3D graphics displaying method according to claim 11, wherein the first ratio is calculated by using an axis W coordinate value in a clipping space, or by using an axis Z coordinate value in a world space, or by using an axis Z coordinate value in the clipping space.

13. The 3D graphics displaying method according to claim 8, wherein the step of executing the near clipping procedure on the triangle according to the second near clipping plane by the 3D graphics processing apparatus comprises:
when the triangle does not intersect the second near clipping plane and the triangle is located outside the view field, the triangle is clipped off; and
when the triangle does not intersect the second near clipping plane and the triangle is located within the view field, the triangle is kept.

14. The 3D graphics displaying method according to claim 13, wherein when an axis Z coordinate value in a clipping space of every vertex of the triangle is smaller than zero, the triangle does not intersect the second near clipping plane and is located outside the view field.

15. A 3D graphics processing apparatus, for displaying a 3D space onto a screen, the 3D graphics processing apparatus comprising:
a processor, configured to comprise:
a vertex processing module, to resolve at least one stereoscopic object in the 3D space into at least one triangle, wherein the triangle has a plurality of vertexes;
a clipping engine, to execute a clipping procedure to clip a visible portion of the 3D space; and
a pixel rendering module, to execute a rendering procedure to display the visible portion onto the screen,
wherein the clipping engine comprises:
a view field module, to determine whether a view point is located between a first near clipping plane and a far clipping plane to generate a determination result; and
a clipping module, to set a second near clipping plane according to the determination result, to set a view field between the second near clipping plane and the far clipping plane, and to execute a near clipping procedure on the triangle according to the second near clipping plane,
wherein when the determination result of the view field module indicates that the view point is located between the first near clipping plane and the far clipping plane, the processor operates the clipping module to set a view point plane of the view point as the second near clipping plane, wherein the view point plane is parallel to the far clipping plane.

16. The 3D graphics processing apparatus according to claim 15, wherein when the determination result of the view field module indicates that the view point is not located between the first near clipping plane and the far clipping plane, the processor operates the clipping module to set the first near clipping plane as the second near clipping plane.

17. The 3D graphics processing apparatus according to claim 15, wherein when the triangle intersects the second near clipping plane, the processor operates the clipping module to respectively calculate a first intersection point and a second intersection point of the triangle and the second near clipping plane by using a first side and a second side of the triangle, wherein the triangle intersects with the second near clipping plane at the first side and the second side, and keeps a polygonal portion of the triangle within the view field, wherein the polygonal portion is formed by the first intersection point, the second intersection point, and at least one internal vertex, the internal vertex is one of the vertexes located within the view field, and the polygonal portion forms the visible portion.

18. The 3D graphics processing apparatus according to claim 17, wherein the processor operates the clipping module to calculate a first ratio, wherein the first ratio is a ratio of a length from the first intersection point to the internal vertex to a length of the first side or a radio of a length from the second intersection point to the internal vertex to a length of the second side, and the processor operates the clipping module to calculate 3-axis coordinates of the first intersection point or the second intersection point according to 3-axis coordinates of the internal vertex, 3-axis coordinates of an external vertex, and the first ratio, wherein the internal vertex and the external vertex are respectively two endpoints of the first side or the second side.

19. The 3D graphics processing apparatus according to claim 18, wherein the first ratio is calculated by using an axis W coordinate value in a clipping space, or by using an axis Z coordinate value in a world space, or by using an axis Z coordinate value in the clipping space.

20. The 3D graphics processing apparatus according to claim 15, wherein when the triangle does not intersect the second near clipping plane and the triangle is located outside the view field, the processor operates the clipping module to clip off the triangle; and when the triangle does not intersect the second near clipping plane and the triangle is located within the view field, the processor operates the clipping module to keep the triangle.

* * * * *